United States Patent
Matsumoto et al.

(10) Patent No.: US 12,466,956 B2
(45) Date of Patent: Nov. 11, 2025

(54) ELECTROCONDUCTIVE RESIN COMPOSITION AND MOLDED ARTICLE OF SAME

(71) Applicant: DENKA COMPANY LIMITED, Tokyo (JP)

(72) Inventors: Mutsumi Matsumoto, Tokyo (JP); Akira Miyama, Tokyo (JP)

(73) Assignee: Denka Company Limited, Tokyo (JP)

( * ) Notice: Subject to any disclaimer, the term of this patent is extended or adjusted under 35 U.S.C. 154(b) by 1051 days.

(21) Appl. No.: 17/268,272

(22) PCT Filed: Aug. 29, 2019

(86) PCT No.: PCT/JP2019/033847
§ 371 (c)(1),
(2) Date: Feb. 12, 2021

(87) PCT Pub. No.: WO2020/045552
PCT Pub. Date: Mar. 5, 2020

(65) Prior Publication Data
US 2021/0246314 A1    Aug. 12, 2021

(30) Foreign Application Priority Data
Aug. 30, 2018  (JP) .................. 2018-161986

(51) Int. Cl.
G09B 23/30    (2006.01)
C08L 91/00    (2006.01)

(52) U.S. Cl.
CPC ............. *C08L 91/00* (2013.01); *G09B 23/30* (2013.01)

(58) Field of Classification Search
CPC ................ G09B 23/30; C08L 91/00
USPC ....................................... 434/272
See application file for complete search history.

(56) References Cited

U.S. PATENT DOCUMENTS

| | | | | |
|---|---|---|---|---|
| 5,785,531 | A * | 7/1998 | Leung | G09B 23/28 434/262 |
| 6,552,131 | B1 | 4/2003 | Higuchi et al. | |
| 8,461,237 | B2 * | 6/2013 | Miyazawa | C08J 3/075 524/706 |
| 2004/0068040 | A1 * | 4/2004 | Chen | C08K 5/01 523/218 |
| 2014/0097389 | A1 * | 4/2014 | Chiba | C08J 9/008 252/511 |
| 2017/0263158 | A1 | 9/2017 | East et al. | |
| 2018/0244912 | A1 | 8/2018 | Miyama et al. | |
| 2019/0390054 | A1 | 12/2019 | Ishii | |
| 2020/0157339 | A1 | 5/2020 | Sasaki et al. | |

FOREIGN PATENT DOCUMENTS

| | | | | |
|---|---|---|---|---|
| JP | S6018537 | A * | 1/1985 | |
| JP | 2001278985 | A | 10/2001 | |
| JP | 2003342483 | A | 12/2003 | |
| JP | 2004217931 | A | 8/2004 | |
| JP | 2007146145 | A | 6/2007 | |
| JP | 2008163272 | A | 7/2008 | |
| JP | 2008197483 | A | 8/2008 | |
| JP | 2009079174 | A * | 4/2009 | |
| JP | 2010065185 | A | 3/2010 | |
| JP | 2013213195 | A | 10/2013 | |
| JP | 2015096595 | A | 5/2015 | |
| JP | 2016038563 | A | 3/2016 | |
| JP | 2016166332 | A | 9/2016 | |
| JP | 2017101217 | A | 6/2017 | |
| JP | 2018119020 | A | 8/2018 | |
| WO | 2016084954 | A1 | 6/2016 | |
| WO | WO-2017030145 | A1 * | 2/2017 | C08J 5/04 |
| WO | 2018097311 | A1 | 5/2018 | |
| WO | 2018151320 | A1 | 8/2018 | |

OTHER PUBLICATIONS

Septon Thermoplastic Elastomers Technical Information, pp. 1-12 (Year: 2019).*
"Permanent Antistatic Agents (Low Resistance) 'Pelectron,'" Sanyo Chemical, https://sanyo-chemical-solutions.com/products/pelectron/ (Year: 2023).*
Search Report for International Application No. PCT/JP2019/033847 dated Nov. 19, 2019.

* cited by examiner

Primary Examiner — Kurt Fernstrom
(74) Attorney, Agent, or Firm — Kim & Stewart LLP

(57) ABSTRACT

[Problem] To provide electroconductive resin compositions that accommodate energy devices and have excellent preservability, and molded articles thereof.
[Solution] An electroconductive resin composition and a molded article thereof, the composition containing components: (A) a hydrogenated styrene-based thermoplastic elastomer having an MFR (measured at a temperature of 230° C. and a load of 2.16 kg) of 1 g/10 min or less, at 100 parts by mass; and (B) an oil at 100-1,000 parts by mass; the composition further containing components: (C) a copolymer of a hydrophobic polymer and a hydrophilic polymer, the copolymer having an MFR (measured at 190° C. and a load of 2.16 kg) of 8 g/10 min or more; and (D) an ionic liquid.

14 Claims, No Drawings

ELECTROCONDUCTIVE RESIN COMPOSITION AND MOLDED ARTICLE OF SAME

TECHNICAL FIELD

The present invention relates to electroconductive resin compositions and molded articles thereof, such as organ models.

BACKGROUND

Recently, expectations have increased for minimally invasive surgery, such as surgery using an endoscope or a laparoscope, which has a low burden on the human body and from which early recovery can be expected, and the number of such cases has increased. For example, endoscopic removal of tumors formed in the submucosa inside an organ (endoscopic submucosal dissection: ESD hereinafter) allows surgery to be performed with smaller wounds compared with conventional laparotomy. Therefore, the physical burden for the patient is reduced, and early social reintegration due to the short hospitalization period is expected. In addition, there has been an increasing number of cases where surgical energy devices are used as the instruments utilized.

Meanwhile, advanced techniques are required for such medical practices as above. To improve techniques and the quality of medical practices, there is a demand for the development of organ models for technique training that are close to the actual organs, and hitherto organ models that can realize a texture similar to that of actual organs have been proposed (Patent Documents 1, 2, and 3).

CITATION LIST

Patent Literature

Patent Document 1: JP 2008-197483 A
Patent Document 2: JP 2016-038563 A
Patent Document 3: JP 2018-119020 A

Technical Problem

Conventional organ models have excellent preservability but did not accommodate medical procedures using energy devices. In addition, although organ models accommodating energy devices have also been developed, the models contain certain amounts of solvents such as water or ethylene glycol, so means (refrigerated storage using a sealed container) for managing solvents and antiseptic measures are required, and even with such measures in place, there were problems such as difficulty in long-term storage, solvent evaporation resulting in a change in shape, and the tendency to bleed out.

It is an object of the present invention to provide electroconductive resin compositions that accommodate energy devices and have excellent preservability, and molded articles thereof.

Solution to Problem

In other words, as a result of examining various means, the present inventors found that the configuration of an electroconductive resin composition containing a hydrogenated styrene-based thermoplastic elastomer, an oil, a copolymer of a hydrophobic polymer and a hydrophilic polymer, and an ionic liquid results in an electroconductive resin composition that accommodates energy devices and has excellent preservability, and arrived at the completion of the present invention.

The present invention, which solves the above problem, is configured as follows.

(1) An electroconductive resin composition comprising components: (A) a hydrogenated styrene-based thermoplastic elastomer having an MFR (measured at a temperature of 230° C. and a load of 2.16 kg) of 1 g/10 min or less, at 100 parts by mass; and (B) an oil at 100-1,000 parts by mass; the composition further comprising components: (C) a copolymer of a hydrophobic polymer and a hydrophilic polymer, the copolymer having an MFR (measured at 190° C. and a load of 2.16 kg) of 8 g/10 min or more; and (D) an ionic liquid.

(2) The electroconductive resin composition of (1), wherein the component (C) is at a content of 100-200 parts by mass with respect to 100 parts by mass of the component (A).

(3) The electroconductive resin composition of (1) or (2), wherein the component (D) ionic liquid is composed of a cation and an anion and is at a content of 50-250 parts by mass with respect to 100 parts by mass of the component (A).

(4) The electroconductive resin composition of any one of (1) to (3), wherein the mass ratio of the component (C) to the component (D) is 4:1 to 2:5.

(5) The electroconductive resin composition of any one of (1) to (4), having a Type E hardness of 3-70.

(6) The electroconductive resin composition of any one of (1) to (5), having a volume resistivity of $1.0 \times 10^2$ to $1.0 \times 10^7$ Ω·cm.

(7) The electroconductive resin composition of any one of (1) to (6), for use in the molding of an organ model for incision and/or dissection with an energy device.

(8) The electroconductive resin composition of any one of (1) to (7), wherein the energy device is selected from the group consisting of an electric scalpel and an ultrasonic scalpel.

(9) A molded article of the electroconductive resin composition of any one of (1) to (8).

(10) The molded article of (9), being an organ model.

Effects of Invention

According to the present invention, it is possible to provide an electroconductive resin composition that accommodates energy devices and has excellent preservability, and a molded article thereof.

DESCRIPTION OF EMBODIMENTS

Various embodiments of the electroconductive resin composition will be described below, and where a specific description provided for one embodiment applies to another embodiment, the description is omitted for the other embodiment.

Electroconductive Resin Composition

The electroconductive resin composition of the present invention contains components: (A) a hydrogenated styrene-based thermoplastic elastomer having an MFR (measured at a temperature of 230° C. and a load of 2.16 kg) of 1 g/10 min or less, at 100 parts by mass; and (B) an oil at 100-1,000 parts by mass; and further contains components: (C) a copolymer of a hydrophobic polymer and a hydrophilic polymer, the copolymer having an MFR (measured at 190° C. and a load of 2.16 kg) of 8 g/10 min or more; and (D) an ionic liquid.

(Component (A): Hydrogenated styrene-based thermoplastic elastomer)

In the present invention, the hydrogenated styrene-based thermoplastic elastomer has a melt mass flow rate (MFR, measured at a temperature of 230° C. and a load of 2.16 kg) of 1 g/10 min or less. MFR can be measured according to, for example, JIS K7210.

The hydrogenated styrene-based thermoplastic elastomer in one embodiment of the present invention is a hydrogenated product of an aromatic vinyl/conjugated diene block copolymer formed from a block polymerization unit (X) derived from an aromatic vinyl and a block polymerization unit (Y) derived from a conjugated diene.

Forms of aromatic vinyl/conjugated diene block copolymers having such a configuration are represented by, for example, $X(YX)_n$ or $(XY)_n$ where n is an integer of 1 or more. Among these, those with the form $X(YX)_n$, particularly those with the form X—Y—X, are preferred. The X—Y—X form is preferably at least one copolymer selected from the group consisting of a polystyrene-polybutadiene-polystyrene block copolymer, a polystyrene-polyisoprene-polystyrene block copolymer, a polystyrene-polyisoprene/butadiene-polystyrene block copolymer.

In such an aromatic vinyl/conjugated diene block copolymer, an aromatic vinyl block unit (X), which is a hard segment, is present as a cross-linking point of a conjugated diene rubber block unit (Y) and forms a pseudo cross-link (domain). This conjugated diene rubber block unit (Y) that is present between the aromatic vinyl block units (X) is a soft segment and exhibits rubber elasticity.

Examples of an aromatic vinyl that forms a block polymerization unit (X) include styrene, α-methyl styrene, 3-methyl styrene, p-methyl styrene, 4-propyl styrene, 4-dodecyl styrene, 4-cyclohexyl styrene, 2-ethyl-4-benzyl styrene, 4-(phenylbutyl) styrene, 1-vinylnaphthalene, and 2-vinylnaphthalene. Among these, styrene is preferred.

Examples of a conjugated diene that forms a block polymerization unit (Y) include butadiene, isoprene, pentadiene, 2,3-dimethyl butadiene, and combinations thereof. Among these, at least one conjugated diene selected from the group consisting of butadiene, isoprene, and a combination of butadiene and isoprene (butadiene/isoprene copolymerization) is preferred. It is also possible to use more than one of these conjugated dienes in combination. The conjugated diene block polymerization unit (Y) formed from butadiene/isoprene copolymerization units may be any of a random copolymerization unit of butadiene and isoprene, a block copolymerization unit thereof, or a tapered copolymerization unit thereof.

In an aromatic vinyl/conjugated diene block copolymer such as that described above, the content of the aromatic vinyl block polymerization unit (X) is preferably 5 mass % or more and 50 mass % or less, and more preferably 20 mass % or more and 40 mass % or less. The content of this aromatic vinyl unit can be measured by a normal method such as infrared spectroscopy, NMR spectroscopy, etc.

The melt flow rate (MFR) (temperature 230° C., load 2.16 kg) of the component (A) is 1 g/10 min or less, and preferably 0.1 g/10 min or less. MFR (temperature 230° C., load 2.16 kg) refers to MFR measured under the conditions of a temperature at 230° C. and a load of 2.16 kg according to JIS K7210. If the MFR is higher than this value, when oil is added, bleed-out occurs more easily and mechanical strength decreases.

Aromatic vinyl/conjugated diene block copolymers such as the above can be produced by various methods. Examples of production methods include (1) a method of consecutively polymerizing an aromatic vinyl and then a conjugated diene using an alkyl lithium compound such as n-butyl-lithium as an initiator, (2) a method of polymerizing an aromatic vinyl and then a conjugated diene, and coupling the same by means of a coupling agent, and (3) a method of consecutively polymerizing a conjugated diene and then an aromatic vinyl using a lithium compound as an initiator.

The hydrogenated styrene-based thermoplastic elastomer used in the present invention is preferably a product of hydrogenation by a publicly-known method of an aromatic vinyl/conjugated diene block copolymer such as that described above, and the hydrogenation rate is 90 mol % or more. This hydrogenation rate is a value when the entire amount of carbon-carbon double bonds in the conjugated diene block polymerization unit (Y) is set as 100 mol %. Examples of such a hydrogenated styrene-based thermoplastic elastomer include polystyrene-poly(ethylene/propylene) block (SEP), polystyrene-poly(ethylene/propylene) block-polystyrene (SEPS), polystyrene-poly(ethylene/butylene) block-polystyrene (SEBS), and polystyrene-poly(ethylene-ethylene/propylene) block-polystyrene (SEEPS). More specific examples include SEPTON (manufactured by Kuraray Co. Ltd.), Kraton (manufactured by Shell Chemicals), Kraton G (manufactured by Shell Chemicals), and Tuftec (manufactured by Asahi Kasei Corp.) (the above being proprietary names).

The hydrogenation rate is measured by a publicly-known method such as nucleic magnetic resonance (NMR) spectroscopy.

In the present invention, SEEPS is preferred as the hydrogenated styrene-based thermoplastic elastomer. From the perspective of oil absorption work before kneading, the hydrogenated styrene-based thermoplastic elastomer is preferably in the form of a powder or an amorphous (crumb) form.

(Component (B): Oil)

The oil is not particularly limited, and examples thereof include mineral oil-based oils such as paraffin-based process oils, naphthene-based process oils, aromatic-based process oils, and liquid paraffin, silicon oil, castor oil, linseed oil, olefin-based waxes, and mineral-based waxes. Among these, paraffin-based and/or naphthene-based process oils are preferred. Examples of the process oil include the Diana Process Oil series (manufactured by Idemitsu Kosan Co., Ltd.) and JOMO Process P (manufactured by Japan Energy Corporation).

The oil is used, for example, to soften the resin composition and adjust the elastic modulus or hardness of the organ model. It is also possible to use one or more oils of the above oils in combination.

It is preferable that the oil is allowed to be absorbed by the hydrogenated styrene-based thermoplastic elastomer in advance in view of workability.

The content of the oil is preferably 100-1,000 parts by mass, more preferably 100-700 parts by mass, still more preferably 100-600 parts by mass, and most preferably 200-500 parts by mass, with respect to 100 parts by mass of the component (A). The content of the oil is adjusted within the range described above according to the site and lesion of the actual organ on which the model is based. By setting the content of the oil to 100 parts by mass or more with respect to 100 parts by mass of the component (A), insufficient softness is suppressed, and by setting to 1,000 parts by mass or less, the hydrogenated styrene-based thermoplastic elastomer cannot completely occlude the oil, so it is possible to suppress compounding inability.

(Component (C): Copolymer of Hydrophobic Polymer and Hydrophilic Polymer)

In the present invention, a copolymer of a hydrophobic polymer and a hydrophilic polymer has an MFR (measured at 190° C. and a load of 2.16 kg) of 8 g/10 min or more.

The copolymer of a hydrophobic polymer and a hydrophilic polymer is not particularly limited as long as it has an antistatic ability, and for example, the antistatic agent described in JP 2001-278985 A, JP 2013-213195 A, JP 2015-096595 A, JP 2016-166332 A, JP 2017-101217 A, or WO 2016/084954 A can be used as a copolymer of a hydrophobic polymer and a hydrophilic polymer in one embodiment of the present invention.

More specific examples include polyethers having a hydrophilic group and being block copolymerized (nonionic types such as polyether ester amides, ethylene oxide-epichlorohydrins, and polyether esters, anionic types such as polystyrene sulfonic acids, and cationic types such as quaternary ammonium-containing poly(meth)acrylates). Among them, a block copolymer having a structure in which a polyether block and a polyolefin block are repeatedly and alternately joined via at least one bond selected from an ester bond, an amide bond, an ether bond, a urethane bond, and an imide bond can be used, and an example thereof is a block copolymer having a structure in which a polyether block, which is a hydrophilic block having a volume resistivity of $10^5$ to $10^{11}$ Ω·cm, and a polyolefin block are repeatedly and alternately joined. The number average molecular weight (Mn) of the block copolymer is preferably 2,000-60,000.

Moreover, examples of commercially available copolymers include those under the proprietary names "PELESTAT®" ("PELESTAT300" "PELESTAT230," "PELESTAT NC6321," "PELESTAT NC6322," "PELESTAT NC7350," "PELESTAT HC250," etc.) and "PELECTRON®" ("PELECTRON PVH," "PELECTRON PVL," "PELECTRON HS," "PELECTRON LMP-FS," etc.) manufactured by Sanyo Chemical Industries, Ltd., the proprietary name "Sankonol®" ("Sankonol TBX-65," etc.) manufactured by Sanko Chemical Industry Co., Ltd., the proprietary name "ENTIRA® AS" manufactured by DuPont-Mitsui, the proprietary name "PEBAX®" manufactured by Arkema, the proprietary name "Stat-Rite®" manufactured by The Lubrizol Corporation, and "IonPhasE® IPE® U2" manufactured by IonPhasE, and these copolymers may be used alone or in combination.

Further, a block polymer in which a polyolefin block, a polyisobutylene block, and a hydrophilic polymer block having a volume resistivity of $1\times10^5$ to $1\times10^{11}$ Ω·cm are joined via at least one bond selected from the group consisting of an ester bond, an amide bond, an ether bond, an imide bond, and a urethane bond can be used as a copolymer of the present embodiment.

Moreover, it is also possible to use a block polymer having, as structural units, a hydrophobic polymer block without polyether, a hydrophilic polymer block, and an aromatic ring-containing hydrophobic polyether block; a block polymer having a structure in which a polyolefin block and a hydrophilic polymer block having a volume resistivity of $10^5$ to $10^{11}$ Ω·cm are repeatedly and alternately joined; and a block polymer having, as structural units, a block of at least one hydrophobic polymer selected from the group consisting of a polyamide, a polyolefin, and a polyamide-imide, a hydrophilic polymer block, and an aromatic ring-containing hydrophobic polyether block; etc.

The Mn of the copolymer in the present invention and the weight average molecular weight (hereinafter abbreviated as Mw) of the same can be measured using gel permeation chromatography (GPC) under the following conditions.

Equipment (for example): PU-980 (manufactured by JASCO Corporation), ERC-3310 (manufactured by ERMA Inc.), AS-8020 (manufactured by Tosoh Corporation), U-620 (manufactured by Sugai Corporation), UV-970 (manufactured by JASCO Corporation), and 2414 Refractive Index Detector (manufactured by Waters Corporation)

Columns (for example): Two "TSK GEL Multipore Hxl-M" (manufactured by Tosoh Corporation)

Measurement temperature: 40° C.

Sample solution: 0.1 weight % tetrahydrofuran solution

Solution injection amount: 100 μl

Detector: Refractive index detector

Reference substance: 12 standard polystyrenes (TSKstandard POLYSTYRENE) (molecular weight: 500, 1,050, 2,800, 5,970, 9,100, 18,100, 37,900, 96,400, 190,000, 355,000, 1,090,000, 2,890,000) (manufactured by Tosoh Corporation)

The content of the copolymer of a hydrophobic polymer and a hydrophilic polymer is preferably 100-200 parts by mass, and more preferably 100-150 parts by mass, with respect to 100 parts by mass of the component (A). By setting the content of the copolymer of a hydrophobic polymer and a hydrophilic polymer to 100 parts by mass or more with respect to 100 parts by mass of the component (A), an increase in the volume resistivity can be suppressed, and by setting the content to 200 parts by mass or less, an increase in the hardness of the material can be suppressed.

(Component D: Ionic Liquid)

The ionic liquid is not particularly limited, and examples thereof include those composed of cations and anions. The ionic liquid in one embodiment of the present invention does not require the addition of a solvent such as water or ethylene glycol and is substantially free thereof.

Examples of the cations include amidinium cations, pyridinium cations, pyrazolium cations, and guanidinium cations.

Examples of amidinium cations include 1,2,3,4-tetramethylimidazolinium cation, 1,3,4-trimethyl-2-ethylimidazolinium cation, 1,3-dimethylimidazolinium cation, 1,3-dimethyl-2,4-diethylimidazolinium cation, 1,2-dimethyl-3,4-diethylimidazolinium cation, 1-methyl-2,3,4-triethylimidazolinium cation, 1,2,3,4-tetraethylimidazolinium cation, 1,2,3-trimethylimidazolinium cation, 1,3-dimethyl-2-ethylimidazolinium cation, 1-ethyl-2,3-dimethylimidazolinium cation, 1,2,3-triethylimidazolinium cation, 4-cyano-1,2,3-trimethylimidazolinium cation, 3-cyanomethyl-1,2-dimethylimidazolinium cation, 2-cyanoethyl-1,3-dimethylimidazolinium cation, 4-acetyl-1,2,3-trimethylimidazolinium cation, 3-acetylmethyl-1,2-dimethylimidazolinium cation, 4-methylcarboxymethyl-1,2,3-trimethylimidazolinium cation, 3-methylcarboxymethyl-1,2-dimethylimidazolinium cation, 4-methoxy-1,2,3-trimethylimidazolinium cation, 3-methoxymethyl-1,2-dimethylimidazolinium cation, 4-formyl-1,2,3-trimethylimidazolinium cation, 3-formylmethyl-1,2-dimethylimidazolinium cation, 3-hydroxyethyl-1,2-dimethylimidazolinium cation, 4-hydroxymethyl-1,2,3-trimethylimidazolinium cation, and 2-hydroxyethyl-1,3-dimethylimidazolinium cation.

Examples of imidazolium cations include 1,3-dimethylimidazolium cation, 1,3-diethylimidazolium cation, 1-ethyl- 3-methylimidazolium cation, 1,2,3-trimethylimidazolium cation, 1,2,3,4-tetramethylimidazolium cation, 1,3-dimethyl-2-ethylimidazolium cation, 1,2-dimethyl-3-ethyl-imidazolium cation, 1,2,3-triethylimidazolium cation, 1,2,3,4-tetraethylimidazolium cation, 1,3-dimethyl-2-phenylimidazolium cation, 1,3-dimethyl-2-benzylimidazolium cation, 1-benzyl-2,3-dimethylimidazolium cation, 4-cyano-1,2,3-trimethylimidazolium cation, 3-cyanomethyl-1,2-dimethylimidazolium cation, 2-cyanomethyl-1,3-dimethyl-imidazolium cation, 4-acetyl-1,2,3-trimethylimidazolium cation, 3-acetylmethyl-1,2-dimethylimidazolium cation, 4-methylcarboxymethyl-1,2,3-trimethylimidazolium cation, 3-methylcarboxymethyl-1,2-dimethylimidazolium cation, 4-methoxy-1,2,3-trimethylimidazolium cation, 3-methoxymethyl-1,2-dimethylimidazolium cation, 4-formyl-1,2,3-trimethylimidazolium cation, 3-formylmethyl-1,2-dimethylimidazolium cation, 3-hydroxyethyl-1,2-dimethylimidazolium cation, 4-hydroxymethyl-1,2,3-trimethylimidazolium cation, and 2-hydroxyethyl-1,3-dimethylimidazolium cation.

Examples of tetrahydropyrimidinium cations include 1,3-dimethyl-1,4,5,6-tetrahydropyrimidinium cation, 1,2,3-trimethyl-1,4,5,6-tetrahydropyrimidinium cation, 1,2,3,4-tetramethyl-1,4,5,6-tetrahydropyrimidinium cation, 1,2,3,5-tetramethyl-1,4,5,6-tetrahydropyrimidinium cation, 8-methyl-1,8-diazabicyclo[5,4,0]-7-undecenium cation, 5-methyl-1,5-diazabicyclo[4,3,0]-5-nonenium cation, 4-cyano-1,2,3-trimethyl-1,4,5,6-tetrahydropyrimidinium cation, 3-cyanomethyl-1,2-dimethyl-1,4,5,6-tetrahydropyrimidinium cation, 2-cyanomethyl-1,3-dimethyl-1,4,5,6-tetrahydropyrimidinium cation, 4-acetyl-1,2,3-trimethyl-1,4,5,6-tetrahydropyrimidinium cation, 3-acetylmethyl-1,2-dimethyl-1,4,5,6-tetrahydropyrimidinium cation, 4-methylcarboxymethyl-1,2,3-trimethyl-1,4,5,6-tetrahydropyrimidinium cation, 3-methylcarboxymethyl-1,2-dimethyl-1,4,5,6-tetrahydropyrimidinium cation, 4-methoxy-1,2,3-trimethyl-1,4,5,6-tetrahydropyrimidinium cation, 3-methoxymethyl-1,2-dimethyl-1,4,5,6-tetrahydropyrimidinium cation, 4-formyl-1,2,3-trimethyl-1,4,5,6-tetrahydropyrimidinium cation, 3-formylmethyl-1,2-dimethyl-1,4,5,6-tetrahydropyrimidinium cation, 3-hydroxyethyl-1,2-dimethyl-1,4,5,6-tetrahydropyrimidinium cation, 4-hydroxymethyl-1,2,3-trimethyl-1,4,5,6-tetrahydropyrimidinium cation, and 2-hydroxyethyl-1,3-dimethyl-1,4,5,6-tetrahydropyrimidinium cation.

Examples of dihydropyrimidinium cations include 1,2,3-trimethyl-1,4-dihydropyrimidinium cation, 1,2,3,4-tetramethyl-1,4-dihydropyrimidinium cation, 1,2,3,5-tetramethyl-1,6-dihydropyrimidinium cation, 8-methyl-1,8-diazabicyclo[5,4,0]-7,9-undecadienium cation, 5-methyl-1,5-diazabicyclo[4,3,0]-5,7-nonadienium cation, 4-cyano-1,2,3-trimethyl-1,6-dihydropyrimidinium cation, 3-cyanomethyl-1,2-dimethyl-1,4-dihydropyrimidinium cation, 2-cyanomethyl-1,3-dimethyl-1,4-dihydropyrimidinium cation, 4-acetyl-1,2,3-trimethyl-1,6-dihydropyrimidinium cation, 3-acetylmethyl-1,2-dimethyl-1,4-dihydropyrimidinium cation, 4-methylcarboxymethyl-1,2,3-trimethyl-1,4-dihydropyrimidinium cation, 3-methylcarboxymethyl-1,2-dimethyl-1,4-dihydropyrimidinium cation, 4-methoxy-1,2,3-trimethyl-1,6-dihydropyrimidinium cation, 3-methoxymethyl-1,2-dimethyl-1,4-dihydropyrimidinium cation, 4-formyl-1,2,3-trimethyl-1,6-dihydropyrimidinium cation, 3-formylmethyl-1,2-dimethyl-1,6-dihydropyrimidinium cation, 3-hydroxyethyl-1,2-dimethyl-1,6-dihydropyrimidinium cation, 4-hydroxymethyl-1,2,3-trimethyl-1,4-dihydropyrimidinium cation, and 2-hydroxyethyl-1,3-dimethyl-1,4-hydropyrimidinium cation.

Examples of pyridinium cations include 3-methyl-1-propylpyridinium cation, 1-propyl-3-methylpyridinium cation, 1-butyl-3-methylpyridinium cation, 1-butyl-4-methylpyridinium cation, 1-butyl-3,4-dimethylpyridinium cation, and 1-butyl-3,5-dimethylpyridinium cation.

Examples of pyrazolium cations include 1,2-dimethylpyrazolium cation, 1-methyl-2-propylpyrazolium cation, 1-n-butyl-2-methylpyrazolium cation, and 1-n-butyl-2-ethylpyrazolium cation.

Examples of guanidinium cations include guanidinium cations with an imidazolinium backbone, guanidinium cations with an imidazolium backbone, guanidinium cations with a tetrahydropyrimidinium backbone, and guanidinium cations with a dihydropyrimidinium backbone.

Examples of guanidinium cations with an imidazolinium backbone include 2-dimethylamino-1,3,4-trimethylimidazolinium cation, 2-diethylamino-1,3,4-trimethylimidazolinium cation, 2-diethylamino-1,3-dimethyl-4-ethylimidazolinium cation, 2-dimethylamino-1-methyl-3,4-diethylimidazolinium cation, 2-diethylamino-1-methyl-3,4-diethylimidazolinium cation, 2-diethylamino-1,3,4-tetraethylimidazolinium cation, 2-dimethylamino-1,3-dimethylimidazolinium cation, 2-diethylamino-1,3-dimethylimidazolinium cation, 2-dimethylamino-1-ethyl-3-methylimidazolinium cation, 2-diethylamino-1,3-diethylimidazolinium cation, 1,5,6,7-tetrahydro-1,2-dimethyl-2H-imido[1,2a]imidazolinium cation, 1,5-dihydro-1,2-dimethyl-2H-imido[1,2a]imidazolinium cation, 1,5,6,7-tetrahydro-1,2-dimethyl-2H-pyrimido[1,2a]imidazolinium cation, 1,5-dihydro-1,2-dimethyl-2H-pyrimido[1,2a]imidazolinium cation, 2-dimethylamino-4-cyano-1,3-dimethylimidazolinium cation, 2-dimethylamino-3-cyanomethyl-1-methylimidazolinium cation, 2-dimethylamino-4-acetyl-1,3-dimethylimidazolinium cation, 2-dimethylamino-3-acetylmethyl-1-methylimidazolinium cation, 2-dimethylamino-4-methylcarboxymethyl-1,3-dimethylimidazolinium cation, 2-dimethylamino-3-methylcarboxymethyl-1-methylimidazolinium cation, 2-dimethylamino-4-methoxy-1,3-dimethylimidazolinium cation, 2-dimethylamino-3-methoxymethyl-1-methylimidazolinium cation, 2-dimethylamino-4-formyl-1,3-dimethylimidazolinium cation, 2-dimethylamino-3-formylmethyl-1-methylimidazolinium cation, 2-dimethylamino-3-hydroxyethyl-1-methylimidazolinium cation, and 2-dimethylamino-4-hydroxymethyl-1,3-dimethylimidazolinium cation.

Examples of guanidinium cations with an imidazolium backbone include 2-dimethylamino-1,3,4-trimethylimidazolium cation, 2-diethylamino-1,3,4-trimethylimidazolium cation, 2-diethylamino-1,3-dimethyl-4-ethylimidazolium cation, 2-dimethylamino-1-methyl-3,4-diethylimidazolium cation, 2-diethylamino-1-methyl-3,4-diethylimidazolium cation, 2-diethylamino-1,3,4-tetraethylimidazolium cation, 2-dimethylamino-1,3-dimethylimidazolium cation, 2-diethylamino-1,3-dimethylimidazolium cation, 2-dimethylamino-1-ethyl-3-methylimidazolium cation, 2-diethylamino-1,3-diethylimidazolium cation, 1,5,6,7-tetrahydro-1,2-dimethyl-2H-imido[1,2a]imidazolium cation, 1,5-dihydro-1,2-dimethyl-2H-imido[1,2a]imidazolium cation, 1,5,6,7-tetrahydro-1,2-dimethyl-2H-pyrimido[1,2a]imidazolium cation, 1,5-dihydro-1,2-dimethyl-2H-pyrimido[1,2a] imidazolium cation, 2-dimethylamino-4-cyano-1,3-dimethylimidazolium cation, 2-dimethylamino-3-cyanomethyl-1-methylimidazolium cation, 2-dimethylamino-4-acetyl-1,3-dimethylimidazolinium cation, 2-dimethylamino-3-acetylmethyl-1-methylimidazolium cation, 2-dimethylamino-4-methylcarboxymethyl-1,3-dimethylimidazolium cation, 2-dimethylamino-3-methylcarboxymethyl-1-methylimidazolium cation, 2-dimethylamino-4-methoxy-1,3-dimethylimidazolium cation, 2-dimethylamino-3-methoxymethyl-1-methylimidazolium cation, 2-dimethylamino-4-formyl-1,3-dimethylimidazolium cation, 2-dimethylamino-3-formylmethyl-1-methylimidazolium cation, 2-dimethylamino-3-hydroxyethyl-1-methylimidazolium cation, and 2-dimethylamino-4-hydroxymethyl-1,3-dimethylimidazolium cation.

Examples of guanidinium cations with a tetrahydropyrimidinium backbone include 2-dimethylamino-1,3,4-trimethyl-1,4,5,6-tetrahydropyrimidinium cation, 2-diethylamino-1,3,4-trimethyl-1,4,5,6-tetrahydropyrimidinium cation, 2-diethylamino-1,3-dimethyl-4-ethyl-1,4,5,6-tetrahydropyrimidinium cation, 2-dimethylamino-1-methyl-3,4-diethyl-1,4,5,6-tetrahydropyrimidinium cation, 2-diethylamino-1-methyl-3,4-diethyl-1,4,5,6-tetrahydropyrimidinium cation, 2-diethylamino-1,3,4-tetraethyl-1,4,5,6-tetrahydropyrimidinium cation, 2-dimethylamino-1,3-dimethyl-1,4,5,6-tetrahydropyrimidinium cation, 2-diethylamino-1,3-dimethyl-1,4,5,6-tetrahydropyrimidinium cation, 2-dimethylamino-1-ethyl-3-methyl-1,4,5,6-tetrahydropyrimidinium cation, 2-diethylamino-1,3-diethyl-1,4,5,6-tetrahydropyrimidinium cation, 1,3,4,6,7,8-hexahydro-1,2-dimethyl-2H-imido[1,2a]pyrimidinium cation, 1,3,4,6-tetrahydro-1,2-dimethyl-2H-imido[1,2a]pyrimidinium cation, 1,3,4,6,7,8-hexahydro-1,2-dimethyl-2H-pyrimido[1,2a]pyrimidinium, 1,3,4,6-tetrahydro-1,2-dimethyl-2H-pyrimido[1,2a]pyrimidinium cation, 2-dimethylamino-4-cyano-1,3-dimethyl-1,4,5,6-tetrahydropyrimidinium cation, 2-dimethylamino-3-cyanomethyl-1-methyl-1,4,5,6-tetrahydropyrimidinium cation, 2-dimethylamino-4-acetyl-1,3-dimethyl-1,4,5,6-tetrahydropyrimidinium cation, 2-dimethylamino-3-acetylmethyl-1-methyl-1,4,5,6-tetrahydropyrimidinium cation, 2-dimethylamino-4-methylcarboxymethyl-1,3-dimethyl-1,4,5,6-tetrahydropyrimidinium cation, 2-dimethylamino-3-methylcarboxymethyl-1-methyl-1,4,5,6-tetrahydropyrimidinium cation, 2-dimethylamino-4-methoxy-1,3-dimethyl-1,4,5,6-tetrahydropyrimidinium cation, 2-dimethylamino-3-methoxymethyl-1-methyl-1,4,5,6-tetrahydropyrimidinium cation, 2-dimethylamino-4-formyl-1,3-dimethyl-1,4,5,6-tetrahydropyrimidinium cation, 2-dimethylamino-3-formylmethyl-1-methyl-1,4,5,6-tetrahydropyrimidinium cation, 2-dimethylamino-3-hydroxyethyl-1-methyl-1,4,5,6-tetrahydropyrimidinium cation, and 2-dimethylamino-4-hydroxymethyl-1,3-dimethyl-1,4,5,6-tetrahydropyrimidinium cation.

Examples of guanidinium cations with a dihydropyrimidinium backbone include 2-dimethylamino-1,3,4-trimethyl-1,4-dihydropyrimidinium cation, 2-diethylamino-1,3,4-trimethyl-1,6-dihydropyrimidinium cation, 2-diethylamino-1,3-dimethyl-4-ethyl-1,6-dihydropyrimidinium cation, 2-dimethylamino-1-methyl-3,4-diethyl-1,4-dihydropyrimidinium cation, 2-diethylamino-1-methyl-3,4-diethyl-1,4-dihydropyrimidinium cation, 2-diethylamino-1,3,4-tetraethyl-1,6-dihydropyrimidinium cation, 2-dimethylamino-1,3-dimethyl-1,4-dihydropyrimidinium cation, 2-diethylamino-1,3-dimethyl-1,4-dihydropyrimidinium cation, 2-dimethylamino-1-ethyl-3-methyl-1,4-dihydropyrimidinium cation, 2-diethylamino-1,3-diethyl-1,6-dihydropyrimidinium cation, 1,6,7,8-tetrahydro-1,2-dimethyl-2H-imido[1,2a]pyrimidinium cation, 1,6-dihydro-1,2-dimethyl-2H-imido[1,2a]pyrimidinium cation, 1,6,7,8-tetrahydro-1,2-dimethyl-2H-pyrimido[1,2a]pyrimidinium cation, 1,6-dihydro-1,2-dimethyl-2H-pyrimido[1,2a]pyrimidinium cation, 2-dimethylamino-4-cyano-1,3-dimethyl-1,4-dihydropyrimidinium cation, 2-dimethylamino-3-cyanomethyl-1-methyl-1,6-dihydropyrimidinium cation, 2-dimethylamino-4-acetyl-1,3-dimethyl-1,4-dihydropyrimidinium cation, 2-dimethylamino-3-acetylmethyl-1-methyl-1,4-dihydropyrimidinium cation, 2-dimethylamino-4-methylcarboxymethyl-1,3-dimethyl-1,4-dihydropyrimidinium cation, 2-dimethylamino-3-methylcarboxymethyl-1-methyl-1,4-dihydropyrimidinium cation, 2-dimethylamino-4-methoxy-1,3-dimethyl-1,6-dihydropyrimidinium cation, 2-dimethylamino-3-methoxymethyl-1-methyl-1,4-dihydropyrimidinium cation, 2-dimethylamino-4-formyl-1,3-dimethyl-1,4,5,6-tetrahydropyrimidinium cation, 2-dimethylamino-3-formylmethyl-1-methyl-1,4,5,6-tetrahydropyrimidinium cation, 2-dimethylamino-3-hydroxyethyl-1-methyl-1,4,5,6-tetrahydropyrimidinium cation, and 2-dimethylamino-4-hydroxymethyl-1,3-dimethyl-1,4-dihydropyrimidinium cation.

Anions with a proton removed from the acids shown below are provided as examples of the anions. A mixture of two or more anions may be used.

As the anion, a carboxylic acid can be used, and specific examples thereof include monocarboxylic acids {aliphatic monocarboxylic acids with 1-30 carbon atoms [saturated monocarboxylic acids (such as formic acid, acetic acid, propionic acid, butyric acid, isobutyric acid, valeric acid, caproic acid, enanthic acid, caprylic acid, pelargonic acid, lauryl acid, myristic acid, stearic acid, and behenic acid), fluorine atom-containing carboxylic acids (such as trifluoroacetic acid), and unsaturated monocarboxylic acids (such as acrylic acid, methacrylic acid, and oleic acid)] and aromatic monocarboxylic acids (such as benzoic acid, cinnamic acid, and naphthoic acid)}, polycarboxylic acids (di- to tetra-valent polycarboxylic acids) {aliphatic polycarboxylic acids [saturated polycarboxylic acids (such as oxalic acid, malonic acid, succinic acid, glutaric acid, adipic acid, pimelic acid, suberic acid, azelaic acid, and sebacic acid); unsaturated polycarboxylic acids (such as maleic acid, fumaric acid, and itaconic acid)]; aromatic polycarboxylic acids [such as phthalic acid, isophthalic acid, terephthalic acid, trimellitic acid, and pyromellitic acid]; aliphatic oxycarboxylic acids [such as glycolic acid, lactic acid, and tartaric acid]; aromatic oxycarboxylic acids [such as salicylic acid and mandelic acid]; sulfur atom-containing polycarboxylic acids [such as thiodipropionic acid]; other polycarboxylic acids [such as cyclobutene-1,2-dicarboxylic acid, cyclopentene-1,2-dicarboxylic acid, furan-2,3-dicarboxylic acid, bicyclo[2,2,1]hepta-2-ene-2,3-dicarboxylic acid, and bicyclo[2,2,1]hepta-2,5-diene-2,3-dicarboxylic acid]; etc.}.

As the anion, a sulfonic acid may be used, and specific examples thereof include alkanesulfonic acids with 1-30 carbon atoms (such as methanesulfonic acid, ethanesulfonic acid, butanesulfonic acid, octanesulfonic acid, and dodecanesulfonic acid); alkylbenzenesulfonic acids with 7-30 carbon atoms (such as octylbenzenesulfonic acid and dodecylbenzenesulfonic acid).

As the anion, an inorganic acid can be used, and specific examples thereof include hydrofluoric acid, hydrochloric acid, sulfuric acid, phosphoric acid, $HClO_4$, $HBF_4$, $HPF_6$, $HAsF_6$, and $HSbF_6$.

As the anion, a halogen atom-containing alkyl group substituted inorganic acid (the alkyl group having 1-30 carbon atoms) can be used, and specific examples thereof include $HBF_n(CF_3)_{4-n}$ (n being an integer of 0-3), $HPF_n(CF_3)_{6-n}$ (n being an integer of 0-5), trifluoromethanesulfonic acid, pentafluoroethanesulfonic acid, heptafluoropropanesulfonic acid, trichloromethanesulfonic acid, pentachloropropanesulfonic acid, heptachlorobutanesulfonic acid, tris(pentafluoroethyl)trifluorophosphate, trifluoroacetic acid, pentafluoropropionic acid, pentafluorobutanoic acid, trichloroacetic acid, pentachloropropionic acid, and heptachlorobutanoic acid.

As the anion, a halogen atom-containing sulfonylimide (having 1-30 carbon atoms) can be used, and specific examples thereof include bis(fluoromethylsulfonyl)imide, bis(trifluoromethanesulfonyl)imide, and bis(fluorosulfonyl)imide.

As the anion, a halogen atom-containing sulfonylmethide (having 3-30 carbon atoms) can be used, and specific examples thereof include tris(trifluoromethylsulfonyl)methide.

As the anion, a halogen atom-containing carboxylic acid amide (having 2-30 carbon atoms) can be used, and specific examples thereof include bis(trifluoroaceto)amide.

As the anion, a nitrile group-containing imide can be used, and specific examples thereof include $HN(CN)_2$.

As the anion, a nitrile-containing methide can be used, and specific examples thereof include $HC(CN)_3$.

As the anion, a halogen atom-containing alkylamine with 1-30 carbon atoms can be used, and specific examples thereof include $HN(CF_3)_2$.

As the anion, a cyanic acid can be used, and specific examples thereof include thiocyanic acid.

Moreover, commercially available ionic liquids can also be used. Examples of commercially available ionic liquids include CIL312 (N-butyl-3-methylpyridinium/bistrifluoromethanesulfonylimide, manufactured by Japan Carlit Co., Ltd.), Aminoion AS100 (manufactured by Nippon Nyukazai Co., Ltd.), Aminoion AS300 (manufactured by Nippon Nyukazai Co., Ltd.), FC-4400 (tri-n-butylmethylammonium bistrifluoromethanesulfonimide, manufactured by 3M), and Hishicolin (dodecyltributylphosphonium chloride, manufactured by Nippon Chemical Industrial Co., Ltd.).

The solubility parameter (hereinafter abbreviated as SP value) of the ionic liquid is preferably 8.0-12.0 $(cal/cm^3)^{1/2}$, more preferably 8.5-11.5 $(cal/cm^3)^{1/2}$, and particularly preferably 9.0-10.8 $(cal/cm^3)^{1/2}$.

Note that the SP value of the ionic liquid is a numerical value determined by the following method.

To a suspension obtained by mixing 50 g of methyl methacrylate and 50 g of an ionic liquid, 2-hydroxyethyl methacrylate was added dropwise, and when the suspension was visually confirmed as having turned transparent, the drip amount (g) of the 2-hydroxyethyl methacrylate was used to calculate an SP value of the ionic liquid with the following equation.

SP value of ionic liquid=$(9.9P+13.5Q)/100$ 9.9: SP value of methyl methacrylate
P: Weight ratio (weight %) of methyl methacrylate based on total weight of methyl methacrylate and 2-hydroxyethyl methacrylate
13.5: SP value of 2-hydroxyethyl methacrylate
Q: Weight ratio (weight %) of 2-hydroxyethyl methacrylate based on total weight of methyl methacrylate and 2-hydroxyethyl methacrylate The method for synthesizing the ionic liquid is not particularly limited as long as the target ionic liquid can be obtained, and examples thereof include a halide method, a hydroxide method, an acid ester method, a complexation method, and a neutralization method, which are described in "Ionic Liquids: The Front and Future of Material Development" (Hiroyuki Ohno, 2003, CMC Publishing Co., Ltd.).

The content of the ionic liquid is preferably 50-250 parts by mass, more preferably 50-240 parts by mass, and still more preferably 70-210 parts by mass, with respect to 100 parts by mass of the component (A). Setting the content of the ionic liquid to 50 parts by mass or more with respect to 100 parts by mass of the component (A) can contribute to the suppression of an increase in volume resistivity and to the impartation of softness, and by setting the content to 250 parts by mass or less, bleed-out of the ionic liquid from the material can be suppressed.

Moreover, the mass ratio of the component (C) to the component (D) is preferably 4:1 to 2:5 and more preferably 2:1 to 5:11. By setting the mass of the component (C) to the mass of the component (D) to 2:5 or more, bleed-out and an increase in volume resistivity can be suppressed, and by setting to 4:1 or less, an increase in the hardness of the material can be suppressed.

(Resin Composition)

The electroconductive resin composition according to the present embodiment accommodates energy devices and has excellent preservability. Moreover, in one embodiment of the present invention, the electroconductive resin composition is substantially free of solvents such as water and ethylene glycol.

The Type E hardness of the electroconductive resin composition is preferably 3-70 and more preferably 3-40. The Type E hardness can be measured, for example, by stacking 5.0 mm-thick sheets and measuring under the condition of 23±1° C. in accordance with the JIS K7215 testing methods for durometer hardness of plastics.

The volume resistivity of the electroconductive resin composition is preferably $1.0 \times 10^2$ to $1.0 \times 10^7$ $\Omega \cdot cm$ and more preferably $1.0 \times 10^2$ or more to less than $5.0 \times 10^4$ $\Omega \cdot cm$.

The volume resistivity can be measured, for example, under the condition of 23±1° C., by using a commercially available instrument (e.g., Hiresta UXMCP-HT800 manufactured by Mitsubishi Chemical Analytech Co., Ltd.) on a 1.0 mm-thick sheet of an arbitrary shape in accordance with JIS C2139.

(Application of Electroconductive Resin Composition)

The electroconductive resin composition in one embodiment of the present invention is used for the formation of an organ model to be incised and/or dissected by an energy device.

Examples of the energy device include an electric scalpel, an ultrasonic scalpel, and a high-frequency radio wave scalpel.

Model organs include, for example, lungs, heart, chest wall, abdominal wall, diaphragm, gallbladder, stomach, liver, kidney, bladder, blood vessels, and skin.

Additionally, it is possible to blend and use, as necessary, other abovementioned resins, elastomers, rubbers, plasticizers, fillers or stabilizers, anti-aging agents, light resistance improvers, ultraviolet absorbers, softeners, lubricants, processing aids, colorants, anti-fogging agents, anti-blocking agents, crystal nucleating agents, foaming agents, etc. in the electroconductive resin composition of the present invention. A publicly-known suitable blending method can be used to produce the electroconductive resin composition of the present invention. For example, melt-mixing can be performed with a single screw extruder, a twin screw extruder, a Banbury type mixer, a plastomill, a co-kneader, a heating roller, etc. Before melt-mixing is performed, the raw materials may be mixed uniformly by a Henschel mixer, a ribbon blender, a super mixer, a tumbler, etc. The melt-mixing temperature is not limited in particular, but is generally 100-300° C., and preferably 150-250° C. Publicly-known molding methods, such as vacuum molding, injection molding, blow molding, and extrusion molding, can be used as the molding methods for various compositions of the present invention.

Molded Article

The molded article of the present invention is formed by molding the electroconductive resin composition of the present invention.

The molded article in one embodiment of the present invention, for example, can be used as an organ model of the lung, heart, chest wall, abdominal wall, diaphragm, gallbladder, stomach, liver, kidney, bladder, blood vessel, skin, etc.

In using the electroconductive resin composition of the present invention in an organ model, it is possible to use, for example, colorants such as pigments and dyes, and additives such as perfumes, antioxidizing agents, and antibacterial agents, as long as the object is not inhibited. In order to make the organ model of the present invention closely resemble an organ in a living body, it is preferably colored, with a colorant, in a color that closely resembles the organ in a living body.

The organ model can be molded by a publicly-known molding method. For example, in cases where molding is performed by using an inner mold (core) and an outer mold and by casting in the space therebetween, during removal of the inner mold, an incision may be made in the resin molding to remove the inner mold therefrom. However, in that case, it is also possible to adhere the incision and complete the organ model. It is also possible to separately mold a plurality of organ portions by injection molding or the like and then adhere them to complete an organ model.

EXAMPLES

Hereinafter, an embodiment of the present invention will be described in detail. The present invention is not limited to the following embodiment and may be carried out with modifications as appropriate as long as the effects of the invention are not inhibited.

The raw materials used in the examples, etc. are as follows.

(A) Hydrogenated Styrene-Based Thermoplastic Elastomer
   SEEPS (SEPTON 4055, manufactured by Kuraray Co., Ltd.) (MFR (temperature 230° C., load 2.16 kg) 0.0 g/10 min, styrene content 30 mass %, hydrogenation rate 90 mol % or more)

(B) Oil
   Paraffin oil (Diana Process Oil PW90, manufactured by Idemitsu Kosan Co., Ltd.)

(C) Copolymer of a Hydrophobic Polymer and a Hydrophilic Polymer
   Polyolefin/polyether copolymer (PELECTRON PVL, manufactured by Sanyo Chemical Industries, Ltd.) (MFR (measured at 190° C. and a load of 2.16 kg) 8 to 15 g/10 min)

(D) Ionic Liquid
   CIL-312 (manufactured by Japan Carlit Co., Ltd.)

The evaluation methods for the various characteristics of the sheets prepared in the examples and comparative examples are as follows.

(Type E Hardness)

Sheets with a thickness of 5.0 mm were stacked, and type E durometer hardness was determined under the condition of 23±1° C. in accordance with the JIS K7215 testing methods for durometer hardness of plastics. This hardness is an instantaneous value. The evaluation criteria are shown in Table 1.

(Volume Resistivity)

In accordance with JIS C2139, a 1.0 mm-thick, 5.0 cm×5.0 cm×1.0 mm sheet was measured for its volume resistivity under the condition of 23±1° C. using Hiresta UXMCP-HT800 and Loresta-GP (MCP-T610) manufactured by Mitsubishi Chemical Analytech Co., Ltd. The evaluation criteria are shown in Table 1.

(State of Surface)

A 2 mm-thick 5 cm square sheet was made and stored for three days, and then the presence or absence of exudation (bleed-out) of oil, etc. from the surface was confirmed. The evaluation criteria are shown in Table 1.

TABLE 1

|  | A (good) | B (acceptable) | C (poor) |
|---|---|---|---|
| Volume resistivity | $1.0 \times 10^2$ or more to less than $5.0 \times 10^4$ | $5.0 \times 10^4$ or more to less than $1.0 \times 10^7$ | $1.0 \times 10^7$ or more, or unmeasurable |
| Type E hardness | 3 or more to less than 40 | 40 or more to less than 70 | greater than 70 |
| State of surface | no bleed-out | small amount of bleed-out | large amount of bleed-out, or phase separation |

Example 1

To 100 parts by mass of the hydrogenated styrene-based thermoplastic elastomer, 300 parts by mass of oil was added dropwise and allowed to sufficiently impregnate the elastomer. After several days, a Brabender Plasti-Corder (PL2000, manufactured by Brabender GmbH) was used, a copolymer of an aqueous polymer and a hydrophilic polymer and an ionic liquid were introduced, and then kneading was performed for six minutes at 180° C. and a rotation speed of 50 revolutions/min.

Next, by a heating press method (180° C., duration 5 minutes, pressure 50 kg/cm²), sample sheets of various thicknesses (1.0 mm, 5.0 mm), for physical property evaluation, were prepared according to the evaluation items, and the above items were evaluated. The results are shown in Table 2.

Examples 2-5 and Comparative Examples 1-3

Except for the contents shown in Table 2, sheets were prepared according to the method of Example 1 and evaluated for the above items. The results are shown in Table 2.

TABLE 2

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Formulation (parts | SEEPS | 100 | 100 | 100 | 100 | 100 | 100 | 100 | 100 |
| | Oil | 300 | 300 | 300 | 500 | 300 | 300 | 300 | 300 |
| | Copolymer | 100 | 100 | 100 | 150 | 100 | 0 | 100 | 0 |

TABLE 2-continued

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| by mass) | Ionic liquid | 80 | 150 | 200 | 80 | 260 | 0 | 0 | 100 |
| Evaluation Criteria | Type E hardness | 35 | 33 | 30 | 36 | 30 | 3 | 44 | unmeasurable |
|  | decision | A (good) | A (good) | A (good) | A (good) | A (good) | A (good) | B (acceptable) | C (poor) |
|  | Volume resistivity ($\Omega \cdot$ cm) | 1.1E+06 | 2.2E+05 | 7.5E+03 | 6.5E+06 | 7.00E+03 | 1.0E+14 | 1.7E+07 | unmeasurable |
|  | decision | B (acceptable) | B (acceptable) | A (good) | B (acceptable) | A (good) | C (poor) | C (poor) | C (poor) |
|  | State of surface/ Shape | no bleed-out | no bleed-out | no bleed-out | no bleed-out | small amount of bleeding | no bleed-out | no bleed-out | large amount of bleed-out phase separation |
|  | decision | good | good | good | good | acceptable | good | good | poor |

It was found that the resin compositions used in Examples 1-5 were not only soft materials having a hardness close to that of organs/tissues/body parts, but also had a low volume resistivity, could be incised by an energy device, and had excellent preservability.

In contrast, it was found that the resin compositions used in Comparative Examples 1-3 could not be energized because of their high volume resistivity, and it was not possible to make a molded article that could be incised by an energy device. Moreover, the resin composition used in Comparative Example 3 could not be molded due to phase separation of the material, and the volume resistivity and the Type E hardness could not be measured.

The invention claimed is:

1. An electroconductive resin composition comprising components:
    (A) a hydrogenated styrene-based thermoplastic elastomer having a melt flow rate, which is measured at a temperature of 230° C. and a load of 2.16 kg, of 1 g/10 min or less, at 100 parts by mass;
    (B) an oil at 100-1,000 parts by mass;
    (C) a block copolymer including polyolefin blocks and polyether blocks that are repeatedly and alternately joined, the block copolymer having a melt flow rate, which is measured at 190° C. and a load of 2.16 kg, of 8 g/10 min or more, the polyether blocks having a volume resistivity of $10^5$ to $10^{11}$ $\Omega \cdot$cm; and
    (D) an ionic liquid,
    wherein the component (D) is at a content of 70-250 parts by mass with respect to 100 parts by mass of the component (A), and the component (C) is at a content of 100-200 parts by mass with respect to 100 parts by mass of the component (A).

2. The electroconductive resin composition according to claim 1, wherein the component (D) is composed of a cation and an anion.

3. The electroconductive resin composition according to claim 1, having an E hardness of 3-70.

4. The electroconductive resin composition according to claim 1, having a volume resistivity of $1.0 \times 10^2$ to $1.0 \times 10^7$ $\Omega \cdot$cm.

5. The electroconductive resin composition according to claim 1, for use in the molding of an organ model for incision and/or dissection with an energy device.

6. The electroconductive resin composition according to claim 5, wherein the energy device is selected from the group consisting of an electric scalpel and an ultrasonic scalpel.

7. A molded article of the electroconductive resin composition according to claim 1.

8. The molded article according to claim 7, being an organ model.

9. The electroconductive resin composition according to claim 1, wherein the component (D) is at a content of 70-210 parts by mass with respect to 100 parts by mass of the component (A).

10. The electroconductive resin composition according to claim 1, wherein a mass ratio of the component (C) to the component (D) is 4:1 to 2:5.

11. The electroconductive resin composition according to claim 1, wherein
    the component (C) further includes a polyisobutylene block, and
    blocks in component (C) are joined via at least one bond selected from the group consisting of: an ester bond, an amide bond, an ether bond, an imide bond, and a urethane bond.

12. The electroconductive resin composition according to claim 1, wherein
    the component (D) has a solubility parameter of 8.0-12.0 $(\text{cal/cm}^3)^{1/2}$.

13. A molding method, comprising:
    forming an organ model by molding the electroconductive resin composition according to claim 1.

14. A method for surgical training, the method comprising:
    using an energy device to cut into an organ model formed with the electroconductive resin composition according to claim 1.

* * * * *